United States Patent [19]
Berndt et al.

[11] 3,741,997
[45] June 26, 1973

[54] PROCESS FOR THE PREPARATION OF PREGNANE DERIVATIVES

[75] Inventors: Hans-Detlef Berndt; Rudolf Wiechert, both of Berlin, Germany

[73] Assignee: Schering, A.G., Berlin, Germany

[22] Filed: May 4, 1971

[21] Appl. No.: 140,262

[30] Foreign Application Priority Data
May 5, 1970   Germany.................. P 20 23 122.5

[52] U.S. Cl. ........................... 260/397.4, 260/397.5
[51] Int. Cl. .................. C07c 167/00, C07c 169/00
[58] Field of Search ...................... 260/397.4, 397.5

[56] References Cited
UNITED STATES PATENTS
3,465,009   9/1969   Teller et al. ..................... 260/397.4
3,485,852   12/1969  Ringold et al. .................. 260/397.4

Primary Examiner—Elbert L. Roberts
Attorney—Millen, Raptes & White

[57] ABSTRACT

17β-Hydroxy-17α-ethynyl steroids are converted to 17-ethers and 17-esters of 17α-hydroxy-20-ketopregnane steroids by forming a 17-sulfite ester of the 17β-hydroxy group with thionyl chloride in the presence of base and then reacting the sulfite ester with an alcohol or carboxylic acid in the presence of an $Hg^{++}$ salt.

30 Claims, No Drawings

PROCESS FOR THE PREPARATION OF PREGNANE DERIVATIVES

BACKGROUND OF THE INVENTION

This invention relates to a process for the preparation of pregnane derivatives, more particularly 17-ethers and esters of 17α-hydroxy-20-keto pregnane steroids and to novel sulfite esters and a process for their production.

The process of this invention is a method for converting 17β-hydroxy-17α-ethinyl steroids into 17α-oxy-20-keto pregnanes. Such methods are known per se (J. Amer. Chem. Soc. 89, 1967, 5505; as well as J. Org. Chem. 33, 1968, 3294). However, these methods are unsuitable for the commercial production of such pregnane steroids, in part because too many reaction steps are required in part because the individual reaction steps are too expensive for a commercial process.

It is an object of this invention to provide a novel process for the conversion of 17α-ethynyl-17β-hydroxy steroids to 17-ethers and esters of 17α-hydroxy-20-keto pregnane steroids. It is another object of this invention to provide novel sulfite esters of Formula III and a process for the preparation of these sulfite esters. Other objects will be apparent to those skilled in the art to which this invention pertains.

SUMMARY OF THE INVENTION

According to this invention, a 17α-ethynyl-17β-hydroxy steroid is converted with thionyl chloride in the presence of base into a 17-bis-sulfite ester, which is then converted with an alcohol or acid in the presence of an $Hg^{++}$ salt into a 17-ether or 17-ester, respectively, of a 17α-hydroxy-20-keto pregnane series steroid.

DETAILED DISCUSSION

The process of this invention can be illustrated in its generic aspects by the following reaction scheme:

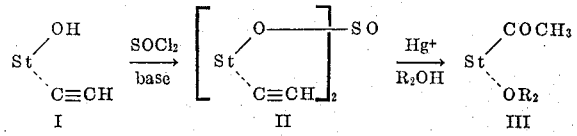

wherein St is a steroidal cyclopentanopolyhydrophenanthrene nucleus bearing the substituents shown in the formulae on its $C_{17}$ carbon atom, and $R_2OH$ is an alcohol or a carboxylic acid. In its preferred aspect, the process can be illustrated by the following reaction scheme:

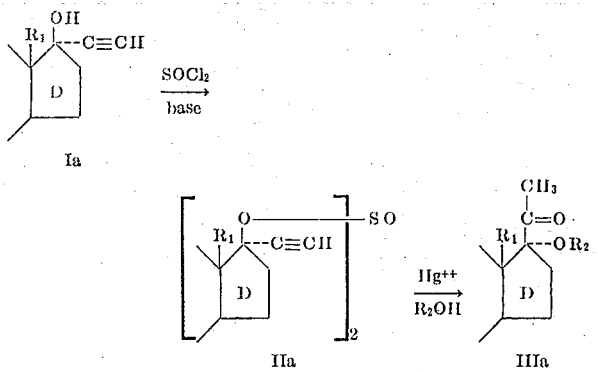

wherein D signifies the D ring of a cyclopentanopolyhydrophenanthrene nucleus and $R_1$ has the value given below and $R_2$ has the value given above.

The steroid nucleus can bear the usual substituents on any or all of its rings, including hydroxy, keto, halo, especially fluoro, oxido, alkyl especially methyl, hydrocarbonoxy, especially lower-alkoxy and benzyloxy, acyloxy, especially lower-alkanoyloxy, e.g., at the 1, 2, 3, 4, 5, 6, 7, 8, 9, 11, 12, 14, 15 and 16 positions. Either or both of the angular methyl groups at the 10 and 13 positions can be present or absent or replaced by higher alkyl, preferably ethyl. The stereoconfiguration can be that of the natural steroids or 8-iso or a racemic mixture of the D- and L- stereoisomers.

The process of this invention is a two-step method of converting 17β-hydroxy-17α-ethynyl steroids to 17-ethers and esters of 17α-hydroxy-20-keto steroids of the pregnane series. A wide variety of these steroids are known. For example, in the substituted and unsubstituted progesterone series, many 17-esters are known which are orally active as anti-fertility compounds. In the substituted and unsubstituted cortisone, hydrocortisone, prednisone and prednisolone series, such 17-esters are known to possess topical anti-inflammatory activity. It will be apparent to those skilled in the art that the pharmacological acitvity of the products of the process of this invention will be dictated by the substituents present in, e.g., the 2, 3, 4, 5, 6, 7, 9 and/or 11-positions according to well-established structure-activity relationships.

For example, the 17β-hydroxy-17α-ethinyl steroids employed as the starting compounds for the process of this invention can bear as substituents an etherified or esterified hydroxy group in the 1-, 3-, 6- and/or 11-position; a keto group in the 3- and/or 11-position; a fluorine atom in the 2-, 4-, 6- and/or 9-position; a methyl group in the 1-, 2- and/or 6-position; and/or a methylene group in the 1,2α-, 5,10α- and/or 6,7α-position.

The starting materials can have one or more double bonds in the molecule, for example, in the 1-, 3-, 4-, 5(6)-, 5(10)-, or 9(11)-position. Also, the A-ring and/or B-ring can be aromatic.

The process of this invention is preferably employed as part of a total steroid synthesis. Therefore, preferred starting compounds for the process are 17β-hydroxy-17α-ethinyl steroids of the general Formula I which can be produced by total synthesis. Such compounds are preferably 17β-hydroxy-17α-ethinyl steroids of the general Formula IV

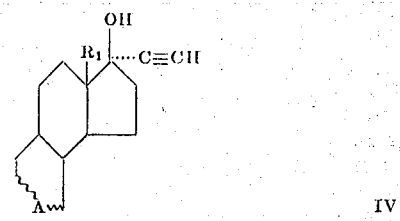

wherein $R_1$ is methyl or ethyl and A is one of the following groups:

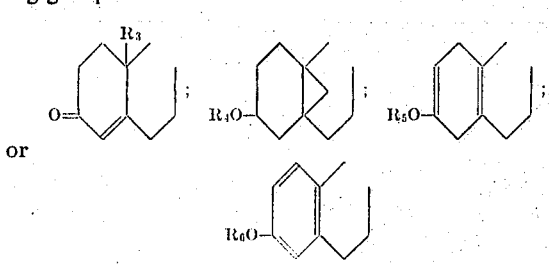

wherein $R_3$ is a hydrogen atom or methyl, $R_4$ and $R_6$ each are a hydrogen atom, alkyl or acyl, and $R_5$ is alkyl or acyl.

Preferred alkyl residues $R_4$, $R_5$, or $R_6$ are lower-alkyl, i.e., containing 1–4 carbon atoms, optionally substituted by a phenyl group. Specific examples are methyl, ethyl and benzyl.

Preferred acyl residues $R_4$, $R_5$, or $R_6$ are the acyl groups of carboxylic acids containing 1–8 carbon atoms, preferably alkanoic. Specific examples are the formyl, acetyl, propionyl, butyryl, or benzoyl.

As will be apparent to those skilled in the art, the preferred sulfite esters of Formula II and Formula IIa and the preferred 17α-oxy-20-keto pregnanes of Formula III and Formula IIIa will also possess the steroid nucleus of the compounds of Formula IV.

The process of this invention is a two-stage process. In the first stage, a 17β-hydroxy-17α-ethinyl steroid of the general Formula II is converted with thionyl chloride, in the presence of a base, into a bis-sulfite ester, e.g., of the Formula II.

Suitable bases for conducting the first stage of the process of this invention are the organic bases which are customarily employed as basic catalysts for esterification reactions with carboxylic acid chlorides. Such bases are well known to those skilled in the art. Particularly suitable bases are the aromatic tertiary N-heterocyclic amines, e.g., pyridine, collidine, lutidine, quinoline, and quinaldine.

The organic base can additionally be diluted with an inert organic solvent. Examples of such solvents are methylene chloride, chloroform, ethylene chloride, dioxane, tetrahydrofuran, benzene, toluene, dimethylformamide and dimethyl sulfoxide.

In order to obtain high yields in the sulfite ester of general Formula II, it is advantageous to conduct the reaction at a low temperature, i.e., below room temperature, preferably below 0°C. Very high yields in sulfite ester can be obtained by effecting the reaction at a temperature of between about −20° C. and about −80° C., preferably about −30° C. to −70° C.

It was surprising that bis sulfite esters were produced by the reaction of 17β-hydroxy-17α-ethinyl steroids with thionyl chloride because it is known that, when thionyl chloride is reacted with other steroids bearing tertiary hydroxyl groups, water is readily split off. Consequently, it would be expected that reacting thionyl chloride with 17β-hydroxy-17α-ethinyl steroids would produce as the reaction product the corresponding 17-ethinyl-Δ$^{16}$-steroids, instead of a bis-sulfite ester.

The thus-produced bis-sulfite esters, in addition to being intermediates for the production of the 17-oxy-20-keto pregnanes of Formulae III and IIIa, possess bacteriostatic activity and, by virtue of the sulfite ester group, are mild reducing agents comparable to dialkylsulfites.

In the second reaction of the process of this invention, the sulfite ester produced in the first step is reacted, in the presence of a mercury (II) salt, with an alcohol or a carboxylic acid.

Examples of carboxylic acids which can be employed are aliphatic, araliphatic and aromatic carboxylic acids containing preferably 1 to 8 carbon atoms, e.g., formic, acetic, propionic, butyric, valeric, hexanoic, octanoic, cyclopentylcarboxylic, cyclopentylacetic, cyclohexylacetic, benzoic, 2-, 3-, or 4-methylbenzoic, and phenylacetic acid.

Examples of alcohols which can be employed are primary alkanols, containing preferably 1–4 carbon atoms, optionally substituted by phenyl, e.g., methanol, ethanol, n-propanol, n-butanol, and benzylalcohol.

The reaction can, of course, be conducted in the presence of an inert reaction solvent as a diluent. Suitable solvents are, for example, polar aprotic solvents, e.g., dimethylformamide, dimethylacetamide, dimethyl sulfoxide, dioxane and tetrahydrofuran. These solvents can be used alone, or in the presence of a non-polar solvent miscible therewith.

Particularly suitable as the mercury (II) salt for the second reaction stage of the process of this invention are the mercury(II) salts of organic carboxylic acids, preferably an aliphatic acid as defined hereinafter, more preferably those containing 1–8 carbon atoms, e.g., mercury(II) formate and mercury(II) acetate. If a carboxylic acid is employed as the reactant in the second reaction, the mercury(II) salts can be produced by reacting mercury(II) oxide with the selected carboxylic acid.

The second reaction of the process of this invention can be conducted at room temperature or at an elevated temperature. Preferably, the reaction is conducted at a reaction temperature of between about 0° C. and 100° C. The product of the reaction in the second stage of the process of this invention is also surprising. Although one skilled in the art knows that corresponding ketones can be produced by reacting acetylene compounds with water, alcohols, or acids in the presence of mercury(II) salts, it could not be predicted that the 17β-positioned hydroxyl group and the 17α-positioned side chain of the sulfite esters of Formula II would be subjected to inversion during the course of the reaction, and the desired pregnane derivatives with a β-positioned side chain would thus be formed.

Preferred $R_2$ groups for the pregnane derivatives of Formula III and Formula IIIa when $R_2O$- is an ether group are those wherein $R_2$ is hydrocarbon, e.g., of 1–8 carbon atoms, preferably lower-alkyl, i.e., containing 1–4 carbon atoms, optionally substituted by phenyl. Specific examples are ethyl, n-propyl, n-butyl, and benzyl. Preferred acyl $R_2$ groups are acyl radicals of carboxylic acids containing 1–8 carbon atoms, e.g., formyl, acetyl, propionyl, butyryl, valeryl, hexanoyl, and benzoyl.

The preferred alcohols and carboxylic acids employed in the second step of the process of this invention to produce the pregnanes of Formula III and Formula IIIa are preferably those of the formula $R_2$ wherein $R_2$ is the preferred group. Especially preferred are methanol, ethanol and benzyl alcohol and formic acid and acetic acid.

Since it is possible, by the process of this invention, to prepare pregnane derivatives from 17-oxoandrostanes and 17-oxoestranes by a three-stage synthesis (the first being ethynylation) which technically is easy to conduct, this invention is particularly valuable as part of a partial or total synthesis of pregnane compounds, for example, gestagenically active 17α-hydroxyprogesterone derivatives, e.g., 17α-hydroxyprogesterone caproate, 17α-hydroxy-19-norprogesterone caproate, 17α-benzyloxy-19-nor-4-pregnene-3, 20-dione and chlormadinone, and corticoids having an antiphlogistic effect, e.g., hydrocortisone, prednisolone, triamcinolone and dexamethasone.

EXAMPLE 1

Forty g. of 17 β-hydroxy-17α-ethinyl-4-androsten-3-one is dissolved in 400 ml. of methylene chloride and 1500 ml. of pyridine. The solution is cooled to −60° C.; then, 40 ml. of thionyl chloride is gradually added dropwise. After maintaining the reaction solution at −60° C. for 1 hour, the reaction product is precipitated in water and then taken up in methylene chloride. The organic phase is washed successively with dilute hydrochloric acid, water, aqueous sodium bicarbonate solution, and water, then dried with sodium sulfate, and concentrated to dryness under vacuum. The residue is triturated and extracted for 1 hour with 1 liter of ethyl acetate. The suspension is allowed to cool, the precipitate is filtered off, recrystallized from ethanol, and thus 36 g. of bis(3-oxo-17α-ethinyl-4-androsten-17β-yl) sulfite is obtained, m.p. 203°–204° C. (decomposition).

EXAMPLE 2

3β-Acetoxy-18-methyl-17α-ethinyl-5β, 19-cycloandrostan-17β-ol (2 g.; m.p. 140°–142° C.) is dissolved in 40 ml. of methylene chloride and 40 ml. of pyridine and mixed with 2 ml. of thionyl chloride at −50° C. After 30 minutes at −50° C., the reaction product is precipitated in water and taken up in methylene chloride. The solution is washed with water, dried over sodium sulfate, and evaporated to dryness under vacuum. The residue of the evaporation step is chromatographed on 100 g. of silica gel. After gradient elution with hexane/25 percent strength ethyl acetate, 1.79 g. of bis(3β-acetoxy-18-methyl-17α-ethinyl-5β, 19-cycloandrostan-17β-yl) sulfite is obtained. After crystallization from hexane/acetone, the compound melts at 178°–179° C. (decomposition).

EXAMPLE 3

In 50 ml. of absolute tetrahydrofuran and 250 ml. of pyridine, 5 g. of 17β-hydroxy-17α-ethinyl-4-estren-3-one is dissolved and mixed, at −60° C., with 5 ml. of thionyl chloride. After 1 hour at −60° C., the reaction product is precipitated in ice water and taken up in methylene chloride. The organic phase is washed with water, then dried over sodium sulfate, and the solvent is evaporated under vacuum. The thus-obtained residue is chromatographed on 200 g. of silica gel. After gradient elution with hexane/25 percent strength ethyl acetate and crystallization from ethyl acetate, 1.2 g. of bis(3-oxo-17α-ethinyl-4-estren-17β-yl) sulfite is obtained, m.p. 188°–189° C. (decomposition).

EXAMPLE 4

Twenty g. of 17β-hydroxy-18-methyl-17α-ethinyl-4-estren-3-one is taken up in 200 ml. of methylene chloride and 750 ml. of pyridine, and the solution is cooled to −70° C. Within 30 minutes, 20 ml. of thionyl chloride is added dropwise to the reaction solution. After 90 minutes at −70° C., the reaction product is precipitated in ice water and taken up in methylene chloride. The organic phase is washed successively with dilute hydrochloric acid, water, aqueous sodium bicarbonate solution, and water, dried over sodium sulfate, and concentrated to dryness under vacuum. The residue of the evaporation step is chromatographed on silica gel. After gradient elution with hexane/30 percent strength ethyl acetate, 15 g. of bis(3-oxo-18-methyl-17α-ethinyl-4-estren-17β-yl)sulfite is obtained; from diisopropyl ether/methylene chloride: m.p. 163°–164° C. (decomposition); from ethanol: m.p. 156°–157° C. (decomposition).

EXAMPLE 5

Six g. of 3-acetoxy-b 17α-ethinyl-1,3,5(10)-estratrien-17β-ol is mixed, in 225 ml. of pyridine and 60 ml. of methylene chloride, with 6 ml. of thionyl chloride at −70° C. After 1 hour at −70° C., the reaction product is precipitated in ice water. The solution is washed successively with dilute hydrochloric acid, water, aqueous sodium bicarbonate solution, and water, dried with sodium sulfate, and concentrated to dryness under vacuum. After recrystallization from ethanol, 3.5 g. of bis-(3-acetoxy-17α-ethinyl-1,3,5(10)-estratrien-17β-yl) sulfite is obtained, m.p. 184°–185° C.

EXAMPLE 6

Six hundred and seventy mg. of bis(3-oxo-17α-ethinyl-4-androsten-17β-yl) sulfite is dissolved in 350 ml. of methanol, and the solution is mixed at room temperature with 3 ml. of water and 638 mg. of mercury(II) acetate. After allowing the reaction mixture to stand for 16 hours at room temperature, the mercury is precipitated with aqueous sodium sulfide solution, the thus-produced mercury sulfide is filtered off over "Celite" and the reaction product is taken up in methylene chloride. The organic phase is washed three times with water, dried with sodium sulfate, and concentrated under vacuum. After crystallizing the residue of the evaporation step from hexane/acetone, 525 mg. of 17α-methoxy-4-pregnene-3,20-dione is obtained having the melting point of 205°–207° C.

EXAMPLE 7

3.35 g. of bis(3-oxo-17α-ethinyl-4-androsten-17β-yl) sulfite is dissolved in 200 ml. of N,N-dimethylacetamide and 400 ml. of glacial acetic acid and mixed with 3.2 g. of mercury-(II) acetate and 2 ml. of water. After 16 hours at room temperature, the mercury is precipitated with aqueous sodium sulfide solution, and the thus-produced mercury sulfide sediment is filtered off over "Celite" (or the reaction solution is adjusted to a pH of 10 with aqueous sodium hydroxide solution, and the mercury is bound with "Complexon"). The reaction product is taken up in methylene chloride, and the organic phase is washed three times with water, dried with sodium sulfate, and concentrated to dryness under vacuum. The evaporation residue is chromatographed on 300 g. of silica gel, thus obtaining, after gradient elution with hexane/50 percent strength ethyl acetate, 1.0 g. of 17α-acetoxyprogesterone, From hexane/acetone: m.p. 237°–240° C.

EXAMPLE 8

Fifty mg. of mercuric oxide, yellow, is dissolved in 5 ml. of 85 percent of formic acid and mixed with 1 g. of bis(3β-acetoxy-18-methyl-17α-ethinyl-5β,19-cycloandrostan-17β-yl) sulfite in 5 ml. of tetrahydrofuran. After 16 hours at room temperature, the reaction product is precipitated with water and taken up in methylene chloride. The organic phase is washed with water and aqueous sodium bicarbonate solution, dried over sodium sulfate, and evaporated to dryness. The residue is chromatographed on 100 g. of silica gel and, after gradient elution with hexane/30 percent strength ethyl acetate, 0.3 g. of 17α-formyloxy-3β-acetoxy-18-methyl-5β,19-cyclopregnan-20-one is obtained.

From hexane/acetone: m.p. 225°–229° C.

EXAMPLE 9

Ten g. of 17β-hydroxy-18-methyl-17α-ethinyl-4-androsten-3-one is reacted, as described in Example 1, in 100 ml. of methylene chloride and 100 ml. of pyridine, with 10 ml. of thionyl chloride at −60° C.

After the reaction mixture has been worked up and recrystallized from ethanol, 7.8 g. of bis(3-oxo-18-methyl-17α-ethinyl-4-androsten-17β-yl) sulfite is obtained.

EXAMPLE 10

1.1 g. of bis(3-oxo-17α-ethinyl-4-estren-17β-yl) sulfite is mixed with 20 ml. of benzyl alcohol, 2.1 g. of mercury(II) acetate, and 8 ml. of water and heated, under a nitrogen atmosphere, to 30° C. for 20 hours.

After working up the reaction mixture as described in Example 7, 17α-benzyloxy-19-nor-4-pregnene-3,20-dione is obtained in the form of a colorless oil. $[\epsilon]_{240} = 15,200$.

EXAMPLE 11

0.63 g. of bis(3-oxo-17α-ethinyl-4-estren-17β-yl) sulfite is mixed with 10 ml. of acetic anhydride, 30 ml. of formic acid, and 30 ml. of dimethylformamide, and the mixture is cooled to +10° C. Then, 500 mg. of mercury(II) acetate is added to the reaction mixture, and the latter is agitated for 3 hours at +10° C.

After the reaction mixture has been worked up as described in Example 8, 400 mg. of 17α-formyloxy-19-nor-4-pregnene-3,20-dione is obtained, m.p. 195°–197° C.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of 17-ethers and esters of 17α-hydroxy-20-keto steroids which comprises the steps of reacting a 17β-hydroxy-17α-ethynyl steroid of the formula

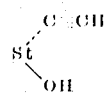

wherein St is a cyclopentano-polyhydrophenanthrene nucleus bearing the substituents shown in the formula on its $C_{17}$ carbon atom, with thionyl chloride in the presence of a base to form a sulfite bis-ester of the 17β-hydroxy group and reacting the thus-produced sulfite bis-ester with a primary or secondary alcohol or carboxylic acid capable of forming ethers and esters, respectively, in the presence of an $Hg^{++}$ salt.

2. A process according to claim 1 wherein the starting steroid bears an angular methyl or ethyl group at the 18-position.

3. A process according to claim 1 wherein the sulfite bis-ester is reacted with a lower-alkanoic acid.

4. A process according to claim 1 wherein the sulfite bis-ester is reacted wtih a hydrocarbon primary alcohol.

5. A process according to claim 1 wherein the sulfite bis-ester is reacted with methanol, ethanol, formic acid or acetic acid.

6. A process according to claim 1 wherein the sulfite bis-ester is reacted with benzyl alcohol.

7. A process according to claim 1 wherein the base is pyridine.

8. A process according to claim 1 wherein the reaction with thionyl chloride is conducted at about −30° C. to about −70° C.

9. A process according to claim 1 wherein the mercury(II) salt is mercury(II) formate or mercury(II) acetate.

10. A process according to claim 1 wherein the starting 17β-hydroxy-17α-ethinyl steroid has the formula

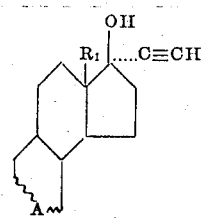

wherein $R_1$ is methyl or ethyl and A is one of the groups

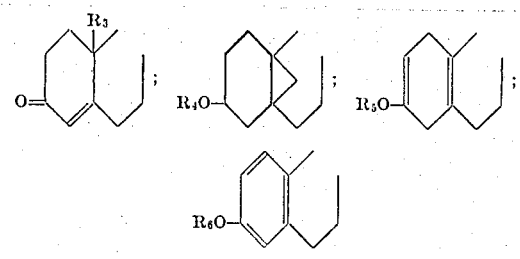

wherein $R_3$ is a hydrogen atom or methyl, $R_4$ and $R_6$ each are a hydrogen atom, alkyl or acyl, and $R_5$ is alkyl or acyl.

11. A process according to claim 1 wherein the starting steroid has an angular methyl or ethyl group at the 18-position; the sulfite bis-ester is reacted with a lower-alkanoic acid or with a hydrocarbon primary alcohol; the base is pyridine; the reaction with thionyl chloride is conducted at about −30° C. to about −70° C; and the mercury(II) salt is mercury(II) formate or mercury(II) acetate.

12. A process according to claim 11 wherein the sulfite bis-ester is reacted with methanol, ethanol, formic acid or acetic acid.

13. A process according to claim 11 wherein the sulfite bis-ester is reacted with benzyl alcohol.

14. A process for the production of a bis-steroidal sulfite ester which comprises reacting a 17β-hydroxy-17α-ethynyl steroid of the formula

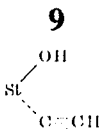

wherein St is a cyclopentano-polyhydrophenanthrene nucleus bearing the substituents shown in the formula on its $C_{17}$ carbon atom, with thionyl chloride in the presence of a base to form a bis sulfite ester of the 17β-hydroxy group.

15. A process according to claim 14 wherein the base is pyridine.

16. A process according to claim 14 wherein the reaction is conducted at about −30° C. to about −70° C.

17. A process according to claim 14 wherein the base is pyridine and wherein the reaction is conducted at about −30° C. to about −70° C.

18. A 17-bis-sulfite ester of a 17β-hydroxy-17α-ethynyl steroid of the formula

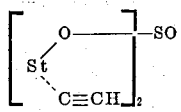

wherein St is a steroidal cyclopentano-polyhydrophenanthrene nucleus bearing the substituents shown in the above formula on its $C_{17}$ carbon atom, said nucleus having the formula

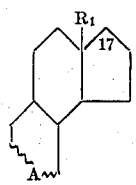

wherein $R_1$ is methyl or ethyl and A is one of the groups

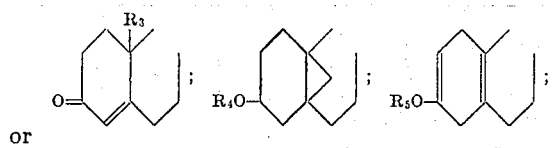

wherein $R_3$ is a hydrogen atom or methyl, $R_4$ and $R_6$ each are a hydrogen atom, alkyl or acyl, and $R_5$ is alkyl or acyl.

19. A compound of claim 18, bis(3-acetoxy-17α-ethinyl-1,3,5(10)-estratrien-17β-yl) sulfite.

20. A compound of claim 18, bis(3-oxo-18-methyl-17α-ethinyl-4-estren-17β-yl) sulfite.

21. A compound of claim 18, bis (3-oxo-17α-ethinyl-4-estren-17β-yl) sulfite.

22. A compound of claim 18, bis (3β-acetoxy-18-methyl-17α-ethinyl-5β,19-cycloandrostan-17β-yl) sulfite.

23. A compound of claim 18, bis(3-oxo-17α-ethinyl-4-androsten-17β-yl) sulfite.

24. A compound of claim 18, bis(3β-acetoxy-18-methyl-17α-ethinyl-5β,19-cycloandrostan-17β-yl)sulfite.

25. A compound of claim 18, bis(3-oxo-18-methyl-17α-ethinyl-4-androsten-17β-yl) sulfite.

26. A process for the production of 17α-ethers and 17α-esters of 20-keto steroids of the pregnane series which comprises reacting a 17-bis-sulfite ester of a 17β-hydroxy-17α-ethynyl steroid of the formula

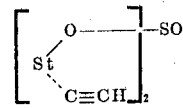

wherein St is a cyclopentano-polyhydrophenanthrene nucleus bearing the substituents shown in the formula on its $C_{17}$ carbon atom, with a primary or secondary alcohol or a carboxylic acid in the presence of an $Hg^{++}$ salt.

27. A process according to claim 27 wherein the $Hg^{++}$ salt is a salt of an aliphatic acid containing 1–8 carbon atoms.

28. A process according to claim 27 wherein the $Hg^{++}$ salt is mercury(II) formate or acetate.

29. 17α-Formyloxy-3β-acetoxy-18-methyl-5β,19-cyclopregnane-20-one.

30. A bis-sulfite ester according to claim 18 of the formula

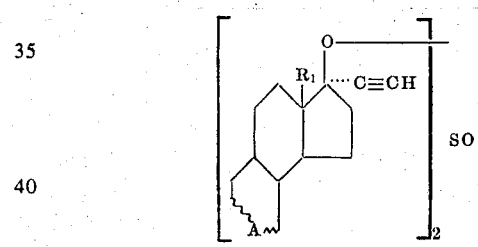

wherein $R_1$ is methyl or ethyl and A is one of the following groups:

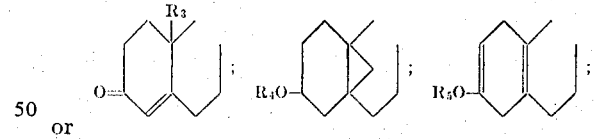

wherein $R_3$ is a hydrogen atom or methyl, $R_4$ and $R_6$ each are a hydrogen atom, alkyl of 1–4 carbon atoms, benzyl or alkanoyl of 1–8 carbon atoms and $R_5$ is alkyl of 1–4 carbon atoms or alkanoyl of 1–8 carbon atoms.

* * * * *